(12) United States Patent
Backman

(10) Patent No.: US 8,050,186 B2
(45) Date of Patent: Nov. 1, 2011

(54) METHOD FOR MODIFYING MSS

(75) Inventor: Jan Backman, Karna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 915 days.

(21) Appl. No.: 11/719,075

(22) PCT Filed: Nov. 15, 2004

(86) PCT No.: PCT/EP2004/012956
§ 371 (c)(1),
(2), (4) Date: May 10, 2007

(87) PCT Pub. No.: WO2006/050753
PCT Pub. Date: May 18, 2006

(65) Prior Publication Data
US 2008/0107026 A1 May 8, 2008

(51) Int. Cl.
*G01R 31/08* (2006.01)
*H04B 7/00* (2006.01)
(52) U.S. Cl. .................. 370/252; 370/235; 370/310
(58) Field of Classification Search .............. 370/235
See application file for complete search history.

(56) References Cited

U.S. PATENT DOCUMENTS

| | | | | |
|---|---|---|---|---|
| 6,389,462 B1* | 5/2002 | Cohen et al. | ............... | 709/218 |
| 6,615,044 B2* | 9/2003 | Tigerstedt et al. | ............ | 455/437 |
| 6,898,640 B1* | 5/2005 | Kurita et al. | ................... | 709/238 |
| 6,973,097 B1* | 12/2005 | Donzis et al. | ................. | 370/470 |
| 7,257,630 B2* | 8/2007 | Cole et al. | ..................... | 709/224 |
| 2002/0071436 A1* | 6/2002 | Border et al. | ........... | 370/395.32 |
| 2004/0199649 A1* | 10/2004 | Tarnanen et al. | ............. | 709/230 |
| 2005/0185664 A1* | 8/2005 | Chaskar et al. | ............... | 370/445 |
| 2006/0020684 A1* | 1/2006 | Mukherjee et al. | ........... | 709/219 |
| 2007/0229214 A1* | 10/2007 | Meirick et al. | ............... | 340/2.23 |

FOREIGN PATENT DOCUMENTS
WO  WO 2004/075487 A  9/2004

OTHER PUBLICATIONS

Calveras, A et al; Institute of Electrical and Electronics Engineers; "Optimizing TCP parameters over GPRS and WLAN real Networks"; 2003 IEEE Pacific RIM Conference on Communications, Computer and Signal Processing (PACRIM 2003); Victoria, BC, Canada; Aug. 28-30, 2003; vol. 2 of 2 conf 9 pp. 663-666 XP010660349.

* cited by examiner

*Primary Examiner* — Kwang B Yao
*Assistant Examiner* — Jutai Kao
(74) *Attorney, Agent, or Firm* — Roger S. Burleigh

(57) ABSTRACT

The invention refers to a method for optimising the data communication in a network comprising a wireless radio network using connection oriented protocol (TCP) over internet protocol (IP). The network comprises a router (SGSN) intervening the connection oriented setup between a host (SERVER) and a client (MS), and changing the maximum segment size (MSS, ms) into a maximum segment size (MSS, sgsn) based on the router's (SGSN) knowledge about the radio network.

10 Claims, 5 Drawing Sheets

METHOD FOR MODIFYING MSS

TECHNICAL FIELD

The present invention refers to a method for optimising the data communication in a network comprising a wireless radio network using a connection oriented protocol over an internet protocol IP. The method comprises:
establishing a communication between a host and a client with a connection oriented protocol over the internet protocol by;
the client sending information to the host what maximum segment size MSS the client can handle;
the host sending a response to the client what maximum segment size MSS the host can handle;
or by;
the host sending information to the client what maximum segment size the host can handle;
the client sending a response to the host what maximum segment size the client can handle.

The invention also refers to a telephone system and a router arranged to carry out the intervention according to the above described method.

ABBREVIATIONS

BSC-Base Station Controller
BTS-Base Transceiver Station
EDGE-Enhanced Data rate for Global Evolution
FDD-Frequency Division Duplex
GGSN-Gateway GPRS Support Node
GPRS-General Packet Radio System
GSM-Global System for Mobile Communications
GTP-GPRS Tunneling Protocol
IP-Internet Protocol
IPv4-Internet Protocol version 4
IPv5-Internet Protocol version 5
IPv6-Internet Protocol version 6
LLC-Logical Link Control
MAC-Medium Access Code
MS-Mobile station
MSS-Maximum Segment Size
MTU-Maximum Transfer Unit
PDP-Packet Data Protocol
QoS-Quality of Service
RLC-Radio Link Control
RNC-Network Control
SFU-payload data
SGSN-Serving GPRS Support Node
SNDCP-Sub Network Dependent Convergence Protocol
TCP-Transport
TDD-Time Division Duplex
UMTS-Universal Mobile Telecommunications System
UTRAN-UMTS Terrestrial Radio Access Network
WCDMA-Wide band Code Division Multiple Access
GTPv0-GPRS Tunnelling Protocol for 2 G and 2, 5 G
GTPv1-GPRS Tunnelling Protocol for 3 G

BACKGROUND ART

In the field of data communication for wireless networks, TCP is used as a connection oriented protocol that fragments and reassembles a byte stream into discrete messages or packets. Furthermore, IP-protocols are used in the next lower layer for delivering IP-packets, e.g. by packet routing.

The TCP service is obtained by having both a host (hereinafter also called SERVER) and a client (hereinafter also called mobile station or MS) create end points called sockets. Each socket has a number (address) comprising an IP address of the host and a 16-bit number local to that host, called a port.

To obtain TCP service a connection must be established between a socket on the SERVER, and a socket on the MS. A socket may be used for multiple connections at the same time. Every byte on a TCP connection has its own 32-bit sequence number used both for acknowledgements and for a window mechanism, which use a separate 32-bit header field.

The sending and receiving TCP entities exchange data in the form of segments. A segment consists of a fixed 20-byte header (plus an optional part) followed by zero or more data bytes. The TCP software decides how the segments should be. It can accumulate data from several writes into one segment or split data from one write over multiple segments. Two limits restrict the segment size. Firstly, each segment, including the TCP header, must fit in the 65,535 byte IP payload. Secondly, each network has a maximum transfer unit (MTU), and each segment must fit in the MTU.

The MTU, is the largest physical packet size, measured in bytes (B), that a network can transmit. Any messages larger than the MTU are divided into smaller packets before being sent.

Every network has a different MTU, which is set by the network administrator. For example, on Windows 95, a user can also set the MTU of his machine. This defines the maximum size of the packets sent from that computer onto the network. Ideally, it is desired that the MTU is the same as the smallest MTU of all the networks between a certain machine and a message's final destination. In practice, the MTU is generally a few thousand bytes and thus defines the upper bound on segment size. If a segment passes through a sequence of networks without being fragmented and then hits a network whose MTU is smaller than the segment, the router at the boundary fragments the segment into two or more smaller segments, which slows down transmission speeds.

In the field of wireless communication there is a certain router in the interface (Gb or Iu) between a land line bound network and the wireless network, The wireless network may comprise MS:s in the form of mobile telephones for mobile telephone services, or mobile telephones or computers for data communication. The wireless network may be in the form of the so called 2 G or 2.5 G standard (the Gb interface) for the use of, for example, GSM or EDGE. The wireless network may also be in the form of the so called 3 G standard (the Iu interface) for the use of, for example, WCDMA. The router breaks down the data stream from the land line network into smaller segments according to the given standard. In the present GPRS standard the router is labelled SGSN, which is a node in a GPRS infrastructure that is responsible for the delivery of data packets from and to the mobile stations within its service area. Its tasks include packet routing and transfer, mobility management (attach/detach and location management), logical link management, and authentication and charging functions. The location register of the SGSN stores location information and user profiles of all GPRS users registered with this SGSN as of June 2001.

A segment that is too large for a network is broken up by the router into multiple segments. Each new segment gets its own IP header, so fragmentation by routers increases the total overhead because each additional segment adds 20 bytes of extra header information in the form of an IP header.

Each host is allowed to specify the maximum TCP payload it is willing to accept, but all Internet hosts are required to accept TCP segments of 536+20 bytes (536 bytes of TCP payload and 20 bytes TCP header+20 B of IP header ending up at an MTU of 576 B). During setup of the TCP connection, each side can announce its maximum segment size (MSS) and can also see the suggested MSS from the counterpart. According to the present TCP/IP standard, the minimum MTU that can be sent without risking fragmentation or MTU Discovery is 576 B in a correctly configured network.

A problem with prior art occurs when the SGSN is forced to fragment the IP segment(s) from the land line network into segments of lesser size in order to satisfy the demands from the wireless network. The lesser sized segments are not optimised by forehand, but serves only to fit the standard of the MS. As a consequence the last of the lesser sized segments may comprise only a small amount of information instead of a complete utilisation of the segment. By not utilising the complete segment for the transport of information, the overall performance of the system is not optimal.

Therefore, there is a need for an improved handling when setting up a connection between a host and a client using a connection oriented protocol in a system comprising a wireless network.

DISCLOSURE OF INVENTION

The object of the invention is to meet the above stated need with a method for optimising the data communication in a network comprising a wireless radio network using a connection oriented protocol over an internet protocol IP. The connection oriented protocol may advantageously be TCP, but may be a different connection oriented protocol in another standard. The method comprises:

establishing a communication between a host and a client with a connection oriented protocol over the internet protocol by;
the client sending information to the host what maximum segment size MSS the client can handle;
the host sending a response to the client what maximum segment size MSS the host can handle;
or by;
the host sending information to the client what maximum segment size the host can handle;
the client sending a response to the host what maximum segment size the client can handle;
letting a router intervening the response from the host or the client, and changing the maximum segment size into a maximum segment size based on the router's knowledge about the radio network.

In the previously known systems using connection oriented protocols over IP, the router is transparent to the negotiation between the client and the host. However, the router negotiates with the client and/or the host regarding the performance of the radio network. The router therefore has knowledge about the wireless radio network, i.e. radio parameters in the wireless system such as capacity etc. One benefit of the invention is that the router intervenes the negotiation and alters or adds (if an MSS value is lacking) the MSS value taking the parameters from the wireless network into account. This gives that the host and the client can be made sending packets (in both directions) that are smaller or larger than what was announced by the end points during the setup phase, thereby enabling a better utilisation of the system by always using optimum fragmentation and thus optimizing the connection oriented protocol payload packet sizes. The method thus gives a better utilisation and performance of the wireless system.

It should also be mentioned that a segment can be a non-fragment segment, i.e. a segment not allowed to be segmented. When a non-fragment segment is too large it is deleted, instead of fragmented, and an ICMP (Internet Control Message Protocol) message is sent to the sending unit that the segment was too large. This is normally called path MTU discovery. The present invention gives a benefit also for transmission of non-fragment segment by the non-fragment segment being optimal in size from the beginning and the path MTU discovery does not need to be brought into action.

Another advantage is that the standard used need not be altered, but by programming the router to intervene, the host and the client can be left unaltered and work according to the previous standard.

Yet one advantage with the invention is thus that the router dynamically calculates the optimum maximum segment size MSS for every new session that is established. The router negotiates with a client or a host in the wireless network, for example regarding LLC, SDU, etc., and thus collects information about the wireless network. Dynamically refers to the router using the information on calculating optimum maximum segment size MSS every time a connection oriented communication is established between a host and a client.

In one embodiment of the invention, the connection oriented protocol is a transmission control protocol TCP.

The invention thus refers to a method acting when a PDP context is negotiated for an MS in the SGSN, where parameters regarding QoS and link layer configuration are negotiated. These values can be used to optimize the TCP packet sizes for negotiate PDP context. This is done by intervening TCP synchronization packets that are used to negotiate the MSS for TCP and change the values for the MSS based on the parameters.

Below follows a number of examples of parameters that can be used in a router such as a GPRS SGSN, as a basis for a decision for altering the MSS.

One example of usage is that the GTPv0 and GTPv1 payload tunnel headers have different sizes. The former is normally 40 B long and the latter is normally 48 B long. Depending on which one of these protocols that is used for tunnelling payload to the GGSN, different TCP packet sizes are optimal to use over the Gn interface.

IP fragmentation on the Iu interface. The IP fragmentation for the GTPv1 protocol is always used for payload traffic.

The SGSN to MS negotiated LLC SDU (payload data) size. The LLC SDU size is normally negotiated to 500 B, which with the SNDCP overhead means that 1500 B end-user packet needs for LLC frames where the last one is 12 B. If the TCP packet size is decreased to 1488 B the radio interface efficiency is increased in a GSM/GPRS based system where the SNDCP is placed in the SGSN. However, in a UMTS/GPRS based system this is not true since the SNDCP is in the RNC for 3 GPP based systems.

Gb interface protocol. Frame relay can handle packets up to 1600, but when Gb-over-IP is introduced the MTU size on the Gb interface may enforce fragmentation depending on the negotiated LLC SDU size, which has a maximum value of 1520 B, but with additional headers to be added. Efficiency for the Gb interface would increase if fragmentation is avoided when possible. Calculations indicate that end-user packets shall not exceed 1423 B to avoid fragmentation if the LLC SDU is negotiated larger than 1427 B.

All the relevant parameters need to be considered for optimal result, but even taking one or some of the parameters into consideration will give a better utilisation of the system.

GPRS is a packet solution for wireless data used in, for example, GSM-based packet switching specification by the European Telecommunications Standards Institute (ETSI)

and 3 G specification by the International Telecommunication ITU for wireless data. In GSM for example, data rates are promised from 56 up to 114 Kbps and continuous connection to the Internet for mobile phone and computer users. The higher data rates will allow users to take part in video conferences and interact with multimedia Web sites and similar applications using mobile handheld devices as well as notebook computers. GPRS will complement existing services such as circuit-switched cellular phone connections and the Short Message Service (SMS) as of July 2000.

When setting up the TCP connection the client sends a SYN (synchronising) segment comprising a flag and information to the host what MSS the client is willing to accept. When the host has received the information it sends a reply comprising SYN acknowledgement and information what MSS the host is willing to accept. This negotiation is transparent to the SGSN, but the Logical Link Control (LLC) protocol ads an LLC header containing checksum and further segmentation In one embodiment, the network comprises a landline based network and the host is comprised in the land line based network and may be in the form of a SERVER, or a user PC (personal computer), or the like. The client is here comprised in the radio network and may be in the form of a mobile station such as a mobile telephone, a PC, or the like.

In one embodiment of the invention, the method handles the intervention in the response in a logical link control protocol in the router.

In one embodiment of the invention, the router is part of a radio link. This may be the situation when, for example, both the host and the client are mobile stations in a wireless local area network WLAN. Both mobile stations have wireless connection with the router and the router is aware of the radio network capacity. When the mobile stations then negotiates MSS, the router intervenes the synchronisation response and transmits an MSS according to the radio network parameters.

In one embodiment, the mobile station is a GSM based equipment or an EDGE based equipment.

In another embodiment, the mobile station is a WCDMA based equipment.

The invention also refers to a telephone system and a router arranged to carry out the intervention according to the above described method.

BRIEF DESCRIPTION OF DRAWINGS

The invention will below be described in connection to a number of drawings where.

EMBODIMENT OF THE INVENTION

Figure 1:
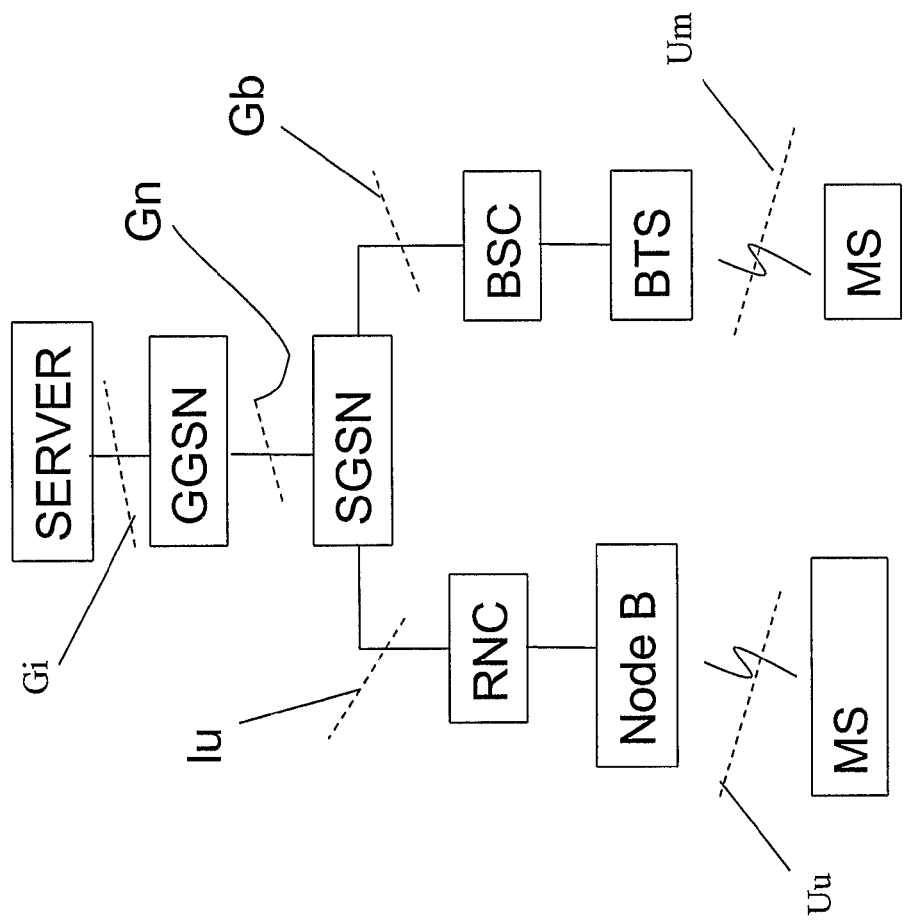
FIG. 1 schematically shows a TCP/IP based network according to prior art.

FIG. 1 schematically shows a TCP/IP based network in a GPRS standard according to prior art. The network comprises a landline based network and a first and a second wireless radio network. The land line based network comprises a host in the form of a SERVER and a GGSN and a SGSN. The first radio network comprises a BSC, a BTS and a client in the form of a MS, all based on GSM or EDGE, see also FIG. 4. The second radio network comprises an RNC, a Node B and a client in the form of an MS, all based on WCDMA, see also FIG. 5. The interface between the GGSN and the SGSN is called Gn, and the interface between the SGSN and the BSC is called Gb, and the interface between the SGSN and the RNC is called Iu. The interface between the MS and the BTS in the first radio network is called $U_m$ and the interface between the MS and the Node-B in the second radio network is called $U_v$. The interface between the GGSN and the SERVER is called $G_i$.

Figure 4:
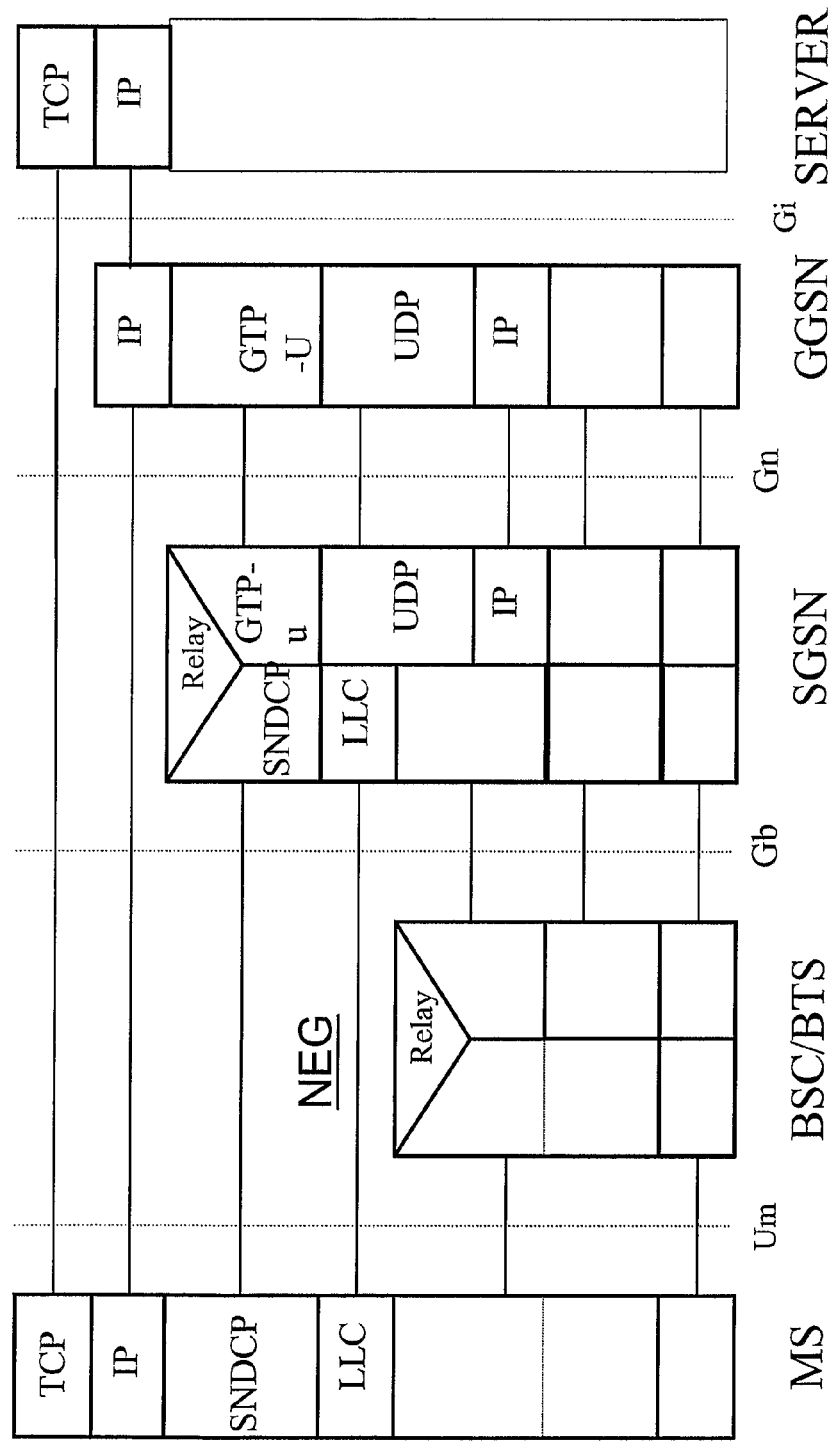
FIG. 4 schematically shows different stacked protocols of the GGSN over the Gn interface to the SGSN and the SGSN over the Gb interface to the MS, and where.
Figure 5:
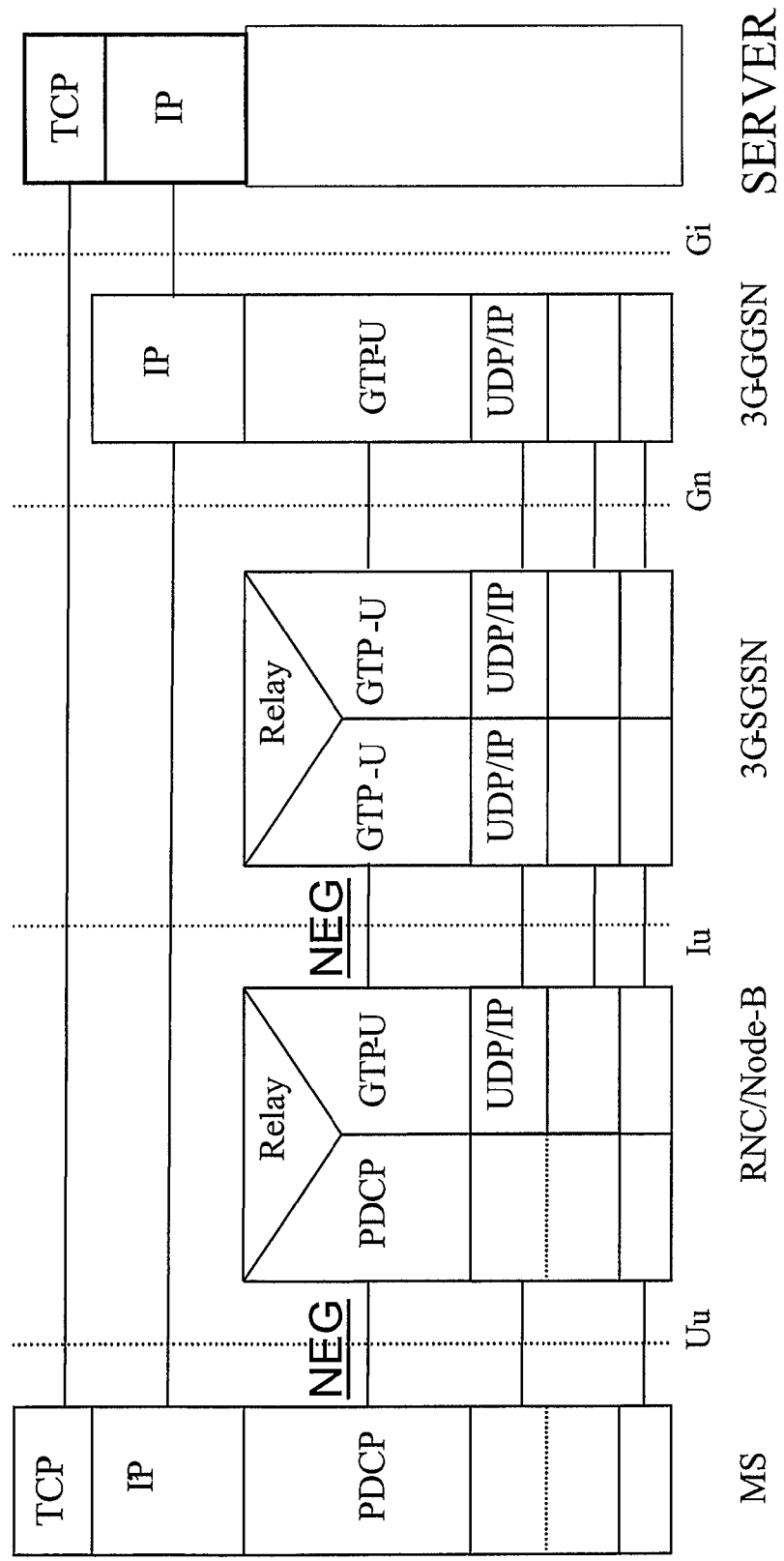
FIG. 5 schematically shows different stacked protocols of the GGSN over the Gn interface to the SGSN and the SGSN over the Iu interface to the MS.

When discussing FIG. 1, cross-references are made to FIGS. 4 and 5. FIG. 4 schematically shows different stacked protocols of the GGSN over the Gn interface to the SGSN and the SGSN over the Gb interface to the MS. FIG. 5 schematically shows different stacked protocols of the GGSN over the Gn interface to the SGSN and the SGSN over the Iu interface to the MS.

The GGSN refers to a gateway GPRS support node acting as an interface between the GPRS backbone network and the external packet data networks (radio network and the IP network). It converts the GPRS packets coming from the SGSN into the appropriate packet data protocol (PDP) format (e.g. IP) and sends them out on the corresponding packet data network. In the other direction, PDP addresses of incoming data packets are converted to the GSM address of the destination user. The readdressed packets are sent to the responsible SGSN. For this purpose, the GGSN stores the current SGSN address of the user and his or her profile in its location register. The GGSN also performs authentication and charging functions towards external systems, whereas SGSN performs GSM authentication.

The function of the SGSN is as a router in the interface between the wireless network and the land line based network and has been explained above.

WCDMA technology is used for UTRAN air interface. UMTS WCDMA is a Direct Sequence CDMA system where user data is multiplied with quasi-random bits derived from WCDMA Spreading codes. In UMTS, in addition to channelisation, Codes are used for synchronisation and scrambling. WCDMA has two basic modes of operation: Frequency Division Duplex (FDD) and Time Division Duplex (TDD).

The functions of the Node-B are:
Air interface Transmission/Reception
Modulation/Demodulation
CDMA Physical Channel coding
Micro Diversity
Error Handing
Closed loop power control
   The functions of the RNC are:
Radio Resource Control
Admission Control
Channel Allocation
Power Control Settings
Handover Control
Macro Diversity
Ciphering
Segmentation/Reassembly
Broadcast Signalling
Open Loop Power Control EDGE (Enhanced Data rates for Global Evolution) is a 3 G technology that delivers broadband-like data speeds to mobile devices. It allows consumers to connect to the Internet and send and receive data, including digital images, web pages and photographs, three times faster than possible with an ordinary GSM/GPRS network.

The invention refers essentially to the, so called, general packet radio system (GPRS). The GPRS of today has an MTU of 1500 B (1500 Bytes). The GPRS is implemented as a virtual link between the MS and the GGSN with 1500 MTU at both ends. Between the SGSN the link is realised as a tunnel over a GTP protocol that adds 40 B-48 B depending on GTP version. GPRS Tunneling Protocol (GTP) is the protocol used between SGSN and GGSN to tunnel various data protocols through the GPRS backbone. In addition to supporting GTPv0 for 2.5 G (GPRS), this feature allows the GGSN to be UMTS R99 compliant with respect to the GTP protocol (called GTPv1 per the 3 GPP R99/UMTS standards specification).

Over the Gb interface in GSM GPRS the virtual link is fragmented into different link protocols such as LLC. The IP frames are fragmented over this frame format and not on the IP level, but on the SNDCP protocol level. However, the LLC protocol is fragmented over the RLC without SGSN being aware, but the SGSN trusts that it is being done. These stacked protocols have frame sizes not aligned for optimal performance and bandwidth utilization.

The radio interfaces Iu in the RNC for UMTS GPRS has the same problem as the Gb interface in GSM GPRS, but here the protocol layers are partly different and protocol layers that are similar between the two standards are differently distributed.

Concentration is performed in the air interface Iu, because the number of traffic channels is limited. The BSC connects traffic channels between the BTS and the SGSN, employing a pool of voice coders that can be connected to the switch in the BSC. The BSC also performs the required switching during a call in progress, as the mobile moves from one cell to another within a BSC service area.

As mentioned above describing prior art, one problem with the existing MSS modification is that the radio interfaces Gb and Iu are not utilized in an optimal way. Large packets over the GTP tunnels can make the GFTP packets exceed 1500 B, which often must be fragmented in the IP network. This is costly for the system and should be avoided.

Figure 2:
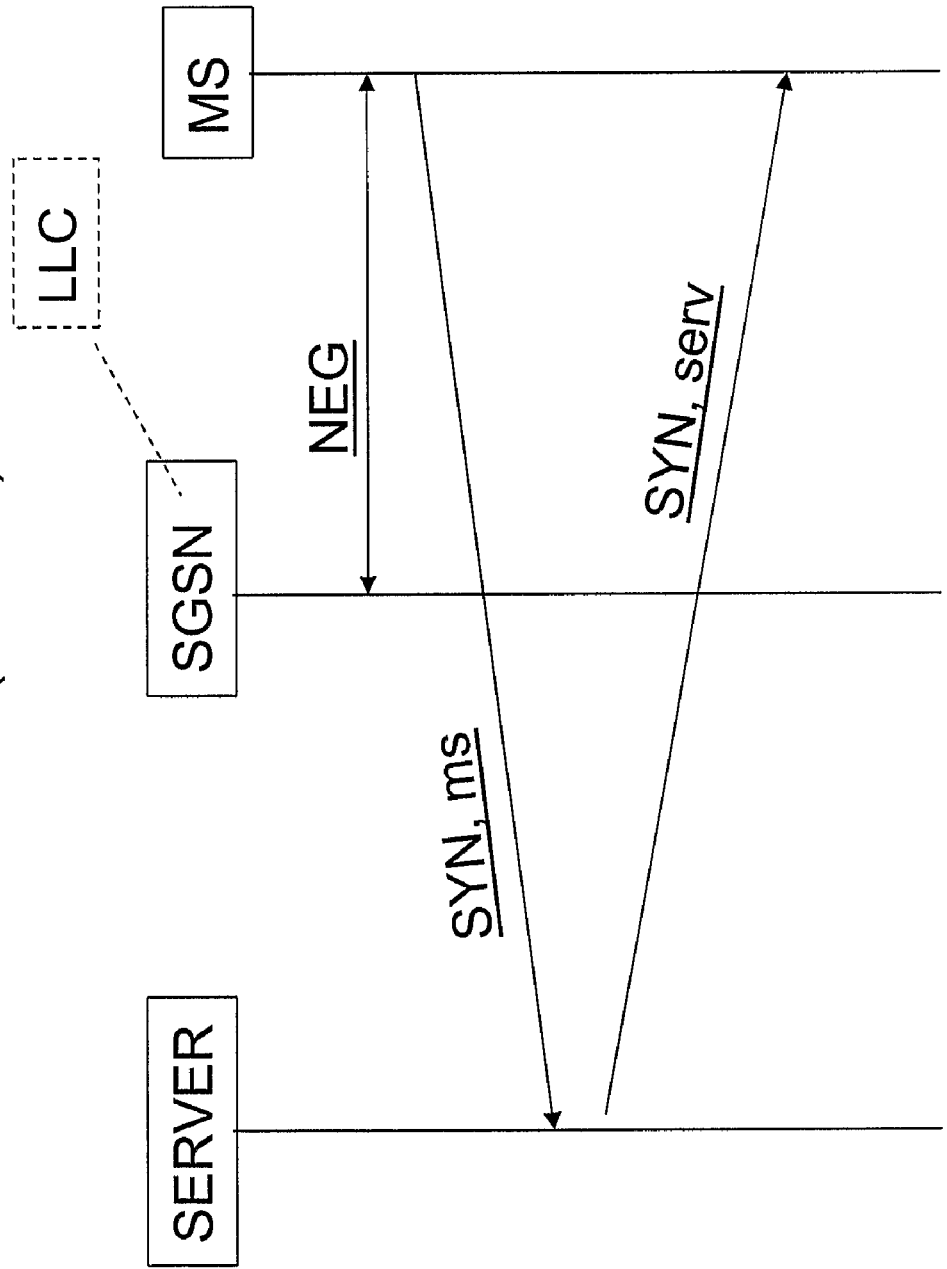
FIG. 2 schematically shows prior art TCP/IP connection setup between a host and a client over a router in the form of an SGSN.

FIG. 2 schematically shows prior art TCP/IP connection setup between the SERVER and the MS over the SGSN in the first wireless radio network. When setting up the TCP connection the MS sends information to the SERVER comprising a sychronising SYN,ue segment comprising a flag and information to the SERVER what MSS the MS is willing to accept. The SERVER sends a response in the form of a SYN, serv (synchronising) segment comprising a flag and information to the MS what MSS the SERVER is willing to accept. Typically the SERVER suggests an MSS of 1500 B and the MS suggests an MSS of 500 B. However, the SGSN is not part of the negotiation between the SERVER and the MS, but the SGSN only passes the information on until a TCP/IP connection has been established. Furthermore, the SGSN handles the breaking down of segments that are too large for the radio network too handle. This has been discussed above as the problem with the present method.

In FIG. 2 the SGSN also negotiates NEG with the MS regarding radio network parameters, for example, information regarding the capacity of the radio network. This negotiation NEG is handled by a LLC protocol in both the MS and the SGSN.

Figure 3:
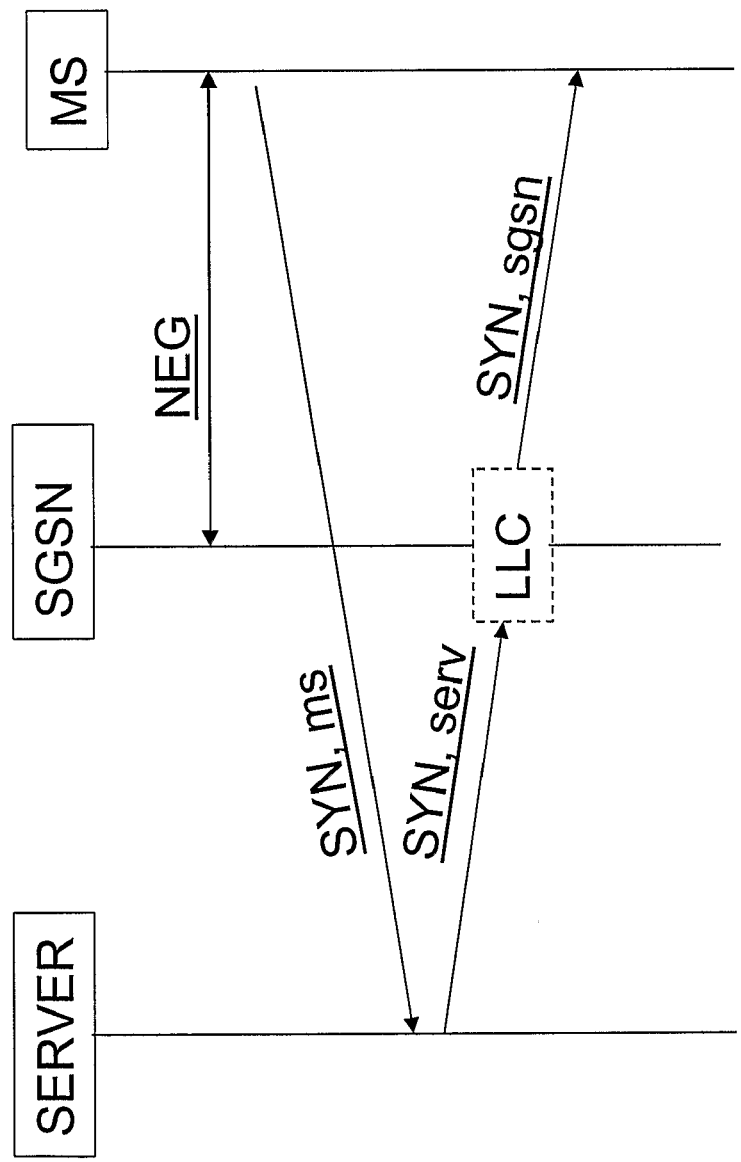
FIG. 3 schematically shows the inventive TCP/IP connection setup between a host and a client over the SGSN.

FIG. 3 schematically shows the inventive TCP/IP connection setup between the SERVER and the MS over the SGSN. In FIG. 3 the SGSN negotiates NEG with the MS. This negotiation NEG gives the SGSN information on the capacity of the radio network. The MS sends information to the SERVER comprising a sychronising SYN,ue segment comprising a flag and information to the SERVER what MSS the MS is willing to accept. Typically the MS suggest an MSS of 500 B. The SERVER sends a response in the form of a SYN,serv (synchronising) segment comprising a flag and information to the MS what MSS the SERVER is willing to accept. Typically the SERVER suggests an MSS of 1500 B. According to the invention the SGSN uses its information on the radio network capacity and interrupts the answer from the SERVER during the setup phase and instead sends a SYN, sgsn to the MS giving an MSS based on the wireless network parameters. The MS is not aware that the SGSN has intervened, but believes that the suggested MSS is a proper suggestion from the SERVER. The SGSN decides the MSS in view of the knowledge about the wireless network such that the fragmentation of the data stream becomes optimal, i.e. such that the SGSN does not have to break up the segments. The segments will thus be used to its maximum.

The invention is not restricted to the above embodiment, but may be varied within the scope of the appending claims. For example, the BSC may, based on the parameters owned by the BSC, change the MSS value that is announced by the endpoints (SERVER and MS) in the setup phase of a TCP session.

The invention claimed is:

1. Method for optimising the data communication in a network comprising a wireless radio network using connection oriented protocol over internet protocol, comprising the steps of:
   establishing a connection oriented communication between a host and a client using the connection oriented protocol over the Internet protocol, comprising the steps of:
   the client sending information to the host what maximum segment size the client can handle;
   the host sending a response to the client what maximum segment size the host can handle;
   or by;
   the host sending information to the client identifying what maximum segment size the host can handle;
   the client sending a response to the host identifying what maximum segment size the client can handle; and,
   letting a router intervene in the response from the host or the client to change the maximum segment size into a maximum segment size based on the router's knowledge about the radio network.

2. Method according to claim 1, wherein the network comprises a landline-based network and wherein the host is located in the landline-based network and wherein the client is located in the radio network.

3. Method according to claim 2, wherein the router negotiates with the client regarding the performance of the radio network.

4. Method according to claim 1, wherein the client is a mobile station in the radio network.

5. Method according to claim 1, wherein both the client and the host are mobile stations in the wireless radio network.

6. Method according to claim 1, wherein the connection oriented protocol is a transmission control protocol (TCP).

7. Method according to claim 1, wherein the method handles the intervention in the response in a logical link control (LLC) protocol in the router.

8. Method according to claim 1, wherein the router is a radio link.

9. Method according to claim 1, wherein the client is a GSM based equipment or an EDGE based equipment.

10. Method according to claim 1, wherein the mobile station is a WCDMA based equipment.

* * * * *

UNITED STATES PATENT AND TRADEMARK OFFICE
CERTIFICATE OF CORRECTION

| | | |
|---|---|---|
| PATENT NO. | : 8,050,186 B2 | Page 1 of 1 |
| APPLICATION NO. | : 11/719075 | |
| DATED | : November 1, 2011 | |
| INVENTOR(S) | : Backman | |

It is certified that error appears in the above-identified patent and that said Letters Patent is hereby corrected as shown below:

On the Title Page, item (75), under "Inventor", in Column 1, Line 1,
delete "Karna" and insert -- Kärna --, therefor.

Signed and Sealed this
Fifteenth Day of May, 2012

David J. Kappos
*Director of the United States Patent and Trademark Office*